United States Patent
Hospodor

(10) Patent No.: US 9,998,390 B1
(45) Date of Patent: *Jun. 12, 2018

(54) PROVIDING STREAMING MEDIA DATA

(71) Applicant: Western Digital Ventures, Inc., Irvine, CA (US)

(72) Inventor: Andrew D. Hospodor, Los Gatos, CA (US)

(73) Assignee: WESTERN DIGITAL VENTURES, INC., Irvine, CA (US)

( * ) Notice: Subject to any disclaimer, the term of this patent is extended or adjusted under 35 U.S.C. 154(b) by 550 days.

This patent is subject to a terminal disclaimer.

(21) Appl. No.: 14/160,360

(22) Filed: Jan. 21, 2014

Related U.S. Application Data

(60) Continuation of application No. 11/846,657, filed on Aug. 29, 2007, now abandoned, which is a division of application No. 10/176,498, filed on Jun. 21, 2002, now Pat. No. 7,274,659.

(60) Provisional application No. 60/308,918, filed on Jul. 27, 2001.

(51) Int. Cl.
*G06F 15/16* (2006.01)
*H04L 12/911* (2013.01)
*H04L 12/725* (2013.01)

(52) U.S. Cl.
CPC ............ *H04L 47/70* (2013.01); *H04L 45/302* (2013.01); *H04L 47/72* (2013.01)

(58) Field of Classification Search
CPC ....... H04L 47/70; H04L 47/72; H04L 47/722; H04L 47/724; H04L 47/726; H04L 47/728
USPC .................................................. 709/223, 229
See application file for complete search history.

(56) References Cited

U.S. PATENT DOCUMENTS

| | | | |
|---|---|---|---|
| 5,926,649 A | 7/1999 | Ma et al. | |
| 5,978,843 A | 11/1999 | Wu et al. | |
| 6,052,600 A * | 4/2000 | Fette | G06F 21/121 |
| | | | 370/329 |
| 6,081,900 A | 6/2000 | Subramaniam et al. | |
| 6,134,658 A | 10/2000 | Multerer et al. | |

(Continued)

OTHER PUBLICATIONS

IPER dated Jun. 13, 2003 received on PCT Application PCT/US02/23517, filed Jul. 23, 2002 (4 pages).

(Continued)

*Primary Examiner* — Aftab N. Khan
(74) *Attorney, Agent, or Firm* — Knobbe, Martens, Olson & Bear LLP

(57) ABSTRACT

A system for servicing streaming media requests. The system includes stream director nodes and intelligent stream engine nodes, such as permanent storage devices with network interfaces. The stream director node receives a streaming media request and enqueues the request until all resources on a path from the stream engine node having the media object being requested to the user/client system have been reserved. Once reserved, the enqueued request is then serviced by requesting the stream object from the stream engine node, which then transfers the requested stream object between the stream engine node and the user/client system over the prepared path without involving the stream director node. Upon completion, the prepared path is torn down. In one embodiment the prepared path is a Label Switched Path. A provision is made for balancing the load among the stream engine nodes by duplicating stream objects on other stream engine nodes.

21 Claims, 16 Drawing Sheets

(56) References Cited

U.S. PATENT DOCUMENTS

| | | | |
|---|---|---|---|
| 6,314,475 B1 | 11/2001 | Collin et al. | |
| 6,377,996 B1 | 4/2002 | Lumelsky et al. | |
| 6,401,126 B1 | 6/2002 | Douceur et al. | |
| 6,438,652 B1 | 8/2002 | Jordan et al. | |
| 6,445,679 B1 | 9/2002 | Taniguchi et al. | |
| 6,446,204 B1 | 9/2002 | Pang et al. | |
| 6,463,454 B1 * | 10/2002 | Lumelsky | G06F 9/5083 707/E17.12 |
| 6,499,054 B1 | 12/2002 | Hesselink et al. | |
| 6,615,312 B1 | 9/2003 | Hamlin et al. | |
| 6,662,231 B1 * | 12/2003 | Drosset | G06F 17/30017 707/E17.009 |
| 6,732,158 B1 | 5/2004 | Hesselink et al. | |
| 6,760,765 B1 | 7/2004 | Asai et al. | |
| 6,788,696 B2 * | 9/2004 | Allan | H04Q 11/0478 370/230 |
| 6,845,508 B2 | 1/2005 | Parry | |
| 6,968,350 B1 | 11/2005 | Chavez, Jr. | |
| 6,990,512 B1 | 1/2006 | Major et al. | |
| 7,120,692 B2 | 10/2006 | Hesselink et al. | |
| 7,171,662 B1 | 1/2007 | Misra et al. | |
| RE39,801 E | 8/2007 | Marbry et al. | |
| 7,274,659 B2 | 9/2007 | Hospodor | |
| 7,454,443 B2 | 11/2008 | Ram et al. | |
| 7,467,187 B2 | 12/2008 | Hesselink et al. | |
| 7,478,434 B1 | 1/2009 | Hinton et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,734,682 B2 * | 6/2010 | Aubry | G06F 21/604 709/203 |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 2002/0064149 A1 | 5/2002 | Elliott et al. | |
| 2002/0112076 A1 | 8/2002 | Rueda et al. | |
| 2003/0005132 A1 | 1/2003 | Nguyen et al. | |
| 2005/0144195 A1 | 6/2005 | Hesselink et al. | |
| 2005/0144200 A1 | 6/2005 | Hesselink et al. | |
| 2007/0214215 A1 * | 9/2007 | McCaleb | G06F 8/65 709/203 |
| 2012/0036041 A1 | 2/2012 | Hesselink | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |

OTHER PUBLICATIONS

Notice of Allowance dated May 24, 2007 from U.S. Appl. No. 10/176,498 8 pages.

Office Action dated Nov. 29, 2006 from U.S. Appl. No. 10/176,498 11 pages.

Office Action dated Jul. 18, 2006 from U.S. Appl. No. 10/176,498 15 pages.

Interview Summary dated Nov. 1, 2013 from U.S. Appl. No. 11/846,657 4 pages.

Final Office Action dated Sep. 18, 2013 from U.S. Appl. No. 11/846,657 10 pages.

Non-Office Action dated Jun. 11, 2013 from U.S. Appl. No. 11/846,657 9 pages.

Advisory Action dated Mar. 11, 2010 from U.S. Appl. No. 11/846,657 3 pages.

Final Office Action dated Dec. 1, 2009 from U.S. Appl. No. 11/846,657 11 pages.

Non-Office Action dated Jul. 24, 2009 from U.S. Appl. No. 11/846,657 15 pages.

Andrew D. Hospodor, et al., U.S. Appl. No. 11/846,657, filed Aug. 29, 2007, 32 pages.

* cited by examiner

PROVIDING STREAMING MEDIA DATA

CROSS-REFERENCE TO RELATED APPLICATIONS

This application is a continuation of U.S. patent application Ser. No. 11/846,657, filed Aug. 29, 2007 and is a divisional of U.S. patent application Ser. No. 10/176,498, filed Jun. 21, 2002, which issued as U.S. Pat. No. 7,274,659. This application also claims priority to U.S. Provisional Patent Application Ser. No. 60/308,918, filed Jul. 27, 2001. Each of the aforementioned applications is hereby incorporated by reference in their entireties.

BACKGROUND OF THE INVENTION

Field of the Invention

The present invention relates generally to a system and method for providing streaming content to a requester and more specifically to streaming content from a stream engine node to a requester while meeting Quality of Service constraints.

Description of the Related Art

Digital streaming data, which includes continuous media such as audio and video streams, must be delivered in a predictable way from source to destination in order to preserve and reproduce at the destination the timing relationships that existed at the source. This generally means delivering packets making up the stream in order and on time. Failure to do so causes garbled and unusable results at the destination. One way of reliably delivering the packets that make up digital streaming data is under a Quality of Service constraint.

Quality of Service (QoS) constraints are well known in the area of networking. For example, a QoS constraint on the transport service of a network can require that a transport connection be established within a specified period of time, that a certain level of throughput be maintained by the established connection over a specified time interval, and that the transport layer provide protection against unauthorized third parties accessing transported data. These constraints can be requested by the user when establishing the connection at the transport level. Very often, if the transport layer cannot achieve the requested constraints, a negotiation occurs between the requesting site and the remote sites of the connection for a set of constraints that are acceptable to both ends of the connection. If a set of constraints is found to be acceptable to both ends of the connection, the connection is set up and the constraints are maintained throughout the duration of the connection.

Though difficult, meeting reasonable QoS constraints in the network context is achievable because the times involved are on the order of microseconds. However, a storage system that is connected to a network meeting QoS constraints is another matter. Storage systems that provide streaming data operate with times on the order of milliseconds and, if rotating media are involved, may have unpredictable response times and throughputs. Streaming data includes an audio stream or video stream or other continuous media for which the receiver must reproduce the timing relationship that existed at the transmitter. The delivery of such data benefits from traversing a network having QoS constraints.

For a network that is connected to such storage systems, it does little good for streaming to have the network meet the QoS constraints while the storage system does not. The servicing of a streaming request by such a storage system will appear to the user as unpredictable and slow and possibly unworkable if the stream is being viewed in real time, even though the network is performing adequately under its QoS constraints. One such prior art streaming storage system 100 is shown in FIG. 1.

In FIG. 1, a plurality of intelligent storage managers 101 each control a plurality of disk or tape devices 102. These intelligent storage managers are connected to one or more servers 103 via a first set of switches 104. The servers in turn are connected to routers 105 for access to the outside world via a second set of switches 106. When a streaming request 107 is made of the system, the request 107 passes through the router 105 and second set of switches 106 to one of the servers 103, which then accesses one of the storage nodes 102 on which the requested streaming object is located. The requested data 108 is then delivered to the server 103 servicing the request, and that server 103 then delivers the requested data to a switch 106 in the second set, to the router 105 and then to the outside world where the requester is located.

Such a system configuration makes it difficult, if not impossible, to meet a QoS constraint on the response time and throughput in servicing the streaming request. The reason is that the requested data must flow through the server 103 system. Thus, a QoS constraint or guarantee can only go so far as the routers 105 and the second set of switches 106, as shown. Prior art systems have sought to remedy this problem by providing more processors and memory in the servers, in effect over-provisioning the servers. However, this solution is expensive, wastes resources, and is not scalable, in the sense that the system cannot grow easily to handle more concurrent streaming requests.

Therefore, there is a need for a storage system, especially a storage system that supplies streaming data to provide the data under the QoS constraints just as the network does, in a scalable manner and without requiring excess resources.

SUMMARY OF THE INVENTION

The present invention is directed towards such a need. A method, in accordance with the present invention, includes receiving a request for a streaming media object at the stream director node and locating a stream engine node to which or from which the streaming media object is to be transferred. The method further includes verifying that sufficient system resources are available to service the request, and preparing a data transfer path between the stream, engine node and the client-system that made the streaming media request. The data transfer path includes one or more resources along the path, but not the stream director node. The method further includes causing resources along the prepared path to be reserved for use by the data transfer, passing the request for the streaming media object from the stream director node to the located stream engine node for servicing, and transferring, over the prepared path, data comprising the streaming media object between the client system that made the request and the located stream engine node.

In one embodiment of the present invention, the transfer of the streaming media object is performed under a Quality of Service constraint.

A system in accordance with the present invention includes at least one stream director node that is configured to: receive a request for a streaming media object at the stream director node; locate a stream engine node to which or from which the streaming media object is to be transferred; verify that sufficient system resources are available to service the request; prepare a data transfer path between the stream engine node and the client system that made the streaming media request, where the stream director node is not included in the data transfer path and the data transfer path includes one or more resources along the path; cause resources along the prepared path to be reserved for use by the data transfer; pass the request for the streaming media object from the stream director node to the located stream engine node for servicing; and transfer, over the prepared path, data comprising the streaming media object between the client system that made the request and the located stream engine node. The system further includes at least one stream engine node for storing streaming media objects including the requested streaming media object, the stream engine node being configured to receive the request for a streaming media object and transfer, over the prepared path, data comprising the streaming media object between the stream engine node on which the object resides and the client system that made the request.

One advantage of the present invention is that the system servicing the streaming media request can operate under a Quality of Service constraint because the processing node is not involved in the transfer of data comprising the streaming media object. The stream engine nodes on which the streaming media object resides handles the data transfer.

Another advantage of the present invention is that it is scalable to handle increased numbers of streaming media requests by adding stream engine nodes and without having to overprovision the stream director node or nodes.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
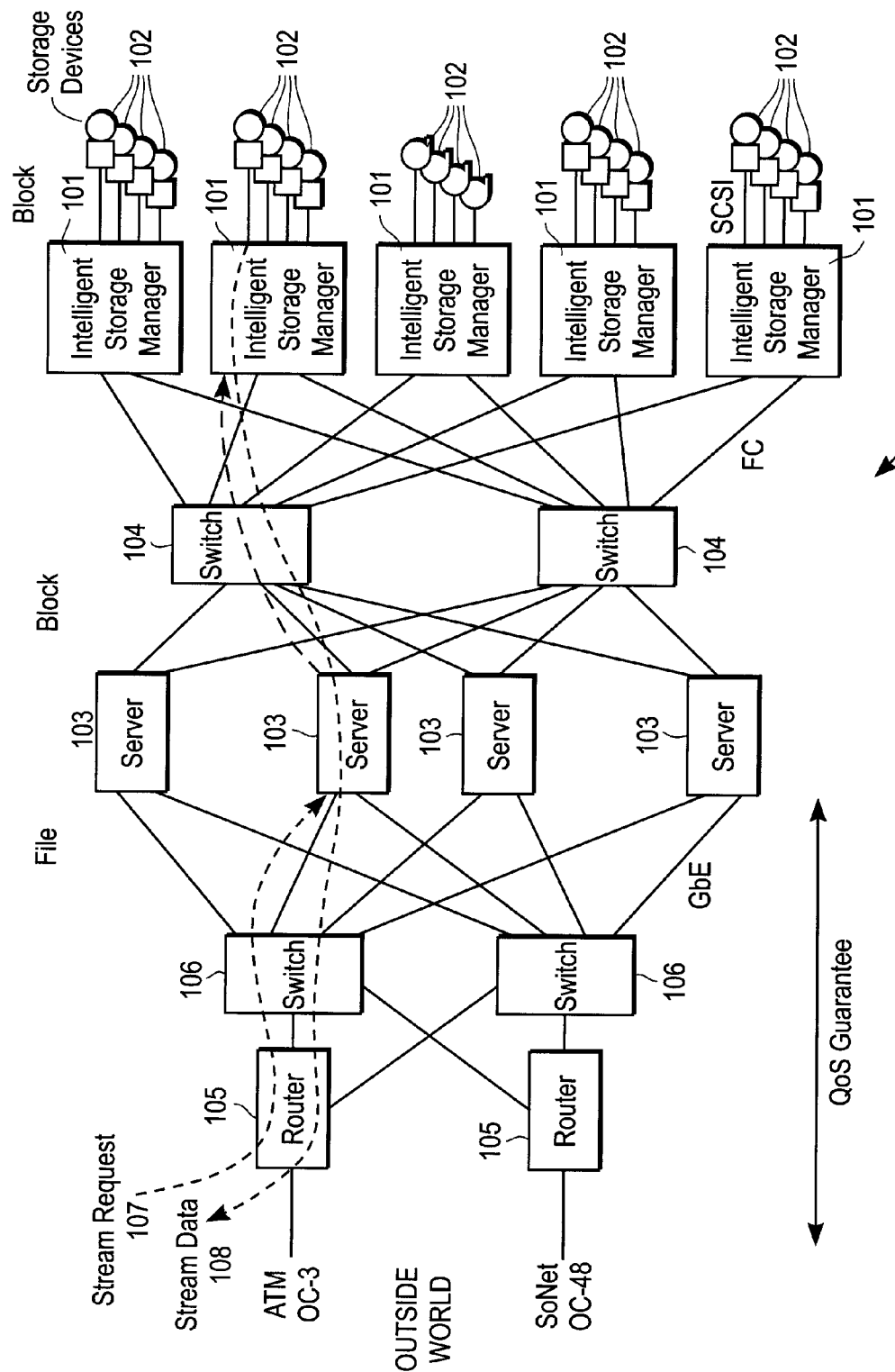
FIG. 1 shows a system of the prior art for delivering streaming data to a requester.
Figure 2:
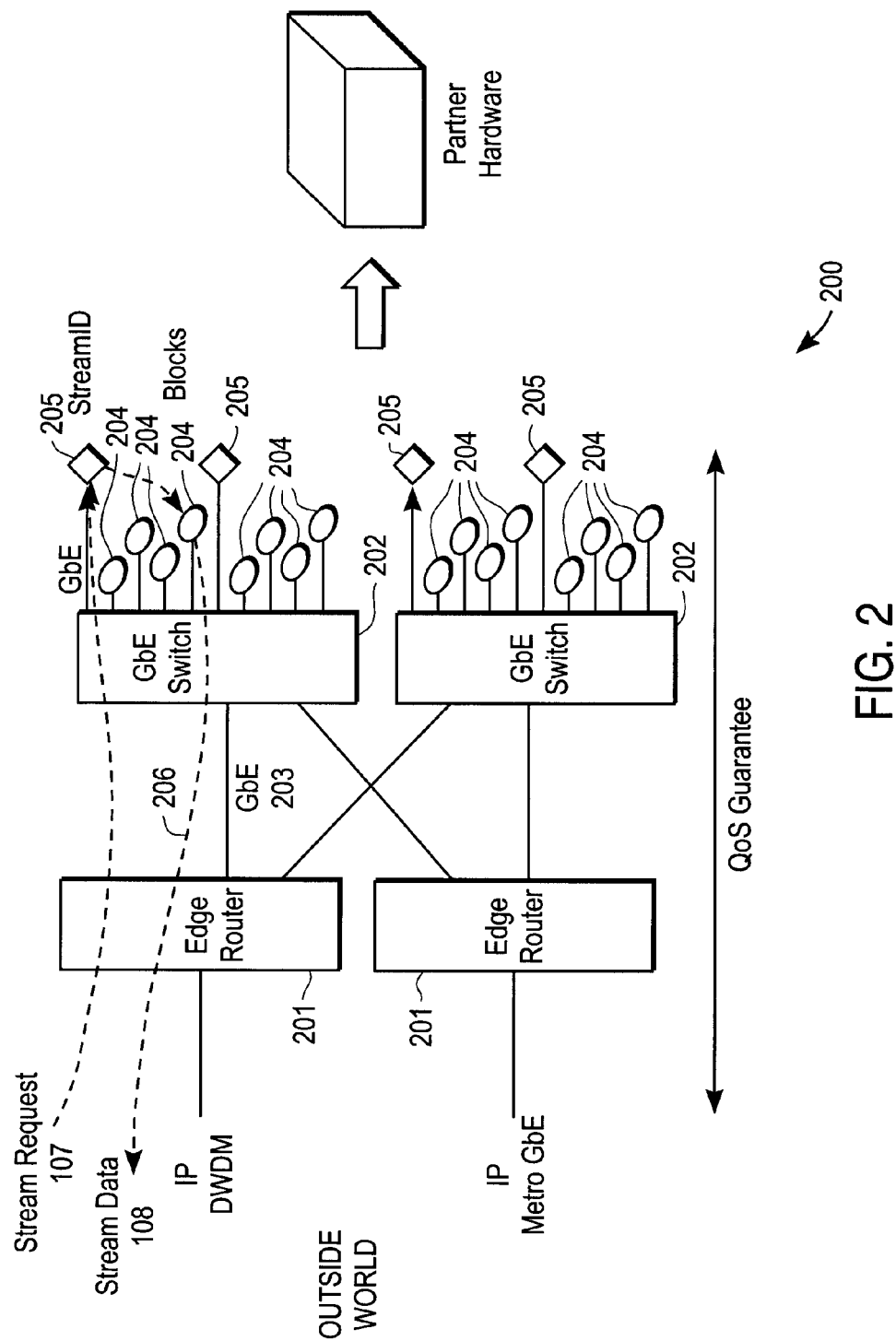
FIG. 2 shows a system of the present invention for delivering streaming data to a requester.

FIG. 2 shows a system, in accordance with one version of the present invention, for delivering streaming data to a requester. The system 200 includes one or more edge routers 201 that are configured to connect to the outside world from which requests are received, one or more high-speed switches 202 to which are connected, via a high-speed point-to-point connection such as Gigabit Ethernet 203, a plurality of stream engine nodes 204 and one or more stream director nodes 205. The stream engine node 204 has a network interface (not shown), such as an Ethernet interface and sometimes called a Network Attached Storage Device (NASD). The stream director node 205 is a standalone computing system and, in one version of the invention, is a PC motherboard with a network card. In other versions of the invention the high speed switches 202 are not present and the stream engine nodes 204 and stream director nodes 205 connect directly to the router or routers 201. In yet another version, server blades (not shown) with various combinations of processor and storage elements are used.

In the system of FIG. 2, a streaming request 107 is passed to a stream director node 205 via an edge router 201 and high-speed switch. The stream director node 205 locates the stream engine node 204, if any, on which the requested streaming media object resides and verifies that sufficient system resources are available to service the request. The stream director node 205 then queues the request 107 until resources to sustain the stream are obtained, prepares a data transfer path 206 that does not include the stream director node 205, and passes the request to the stream engine node 204 for servicing. The stream engine node 204 with the requested data then starts streaming the data via the switches 202 and router 201 of the system to the outside world and ultimately to the user's system that requested the streaming data.

If sufficient resources are not available, the stream director node 205 may hold the request 107 in its queue until a later time, pass the queued request along to another stream director node 205, which may be able to obtain the needed resources to service the request, or simply return the request 107 to the requester.

In the configuration of the present invention there are no servers through which the streaming data 108 must pass to reach the ultimate requester. Therefore, a QoS constraint can be imposed on the system all the way to and including the stream engine node 204 servicing the request. Furthermore, the system is scalable without over-provisioning by simply adding more stream engine nodes 204 and not necessarily more stream director nodes 205, and the system is deadlock free because all resources needed to service the stream request 107 are obtained before the request 107 is serviced and as a condition of the request 107 being serviced.

Figure 3:
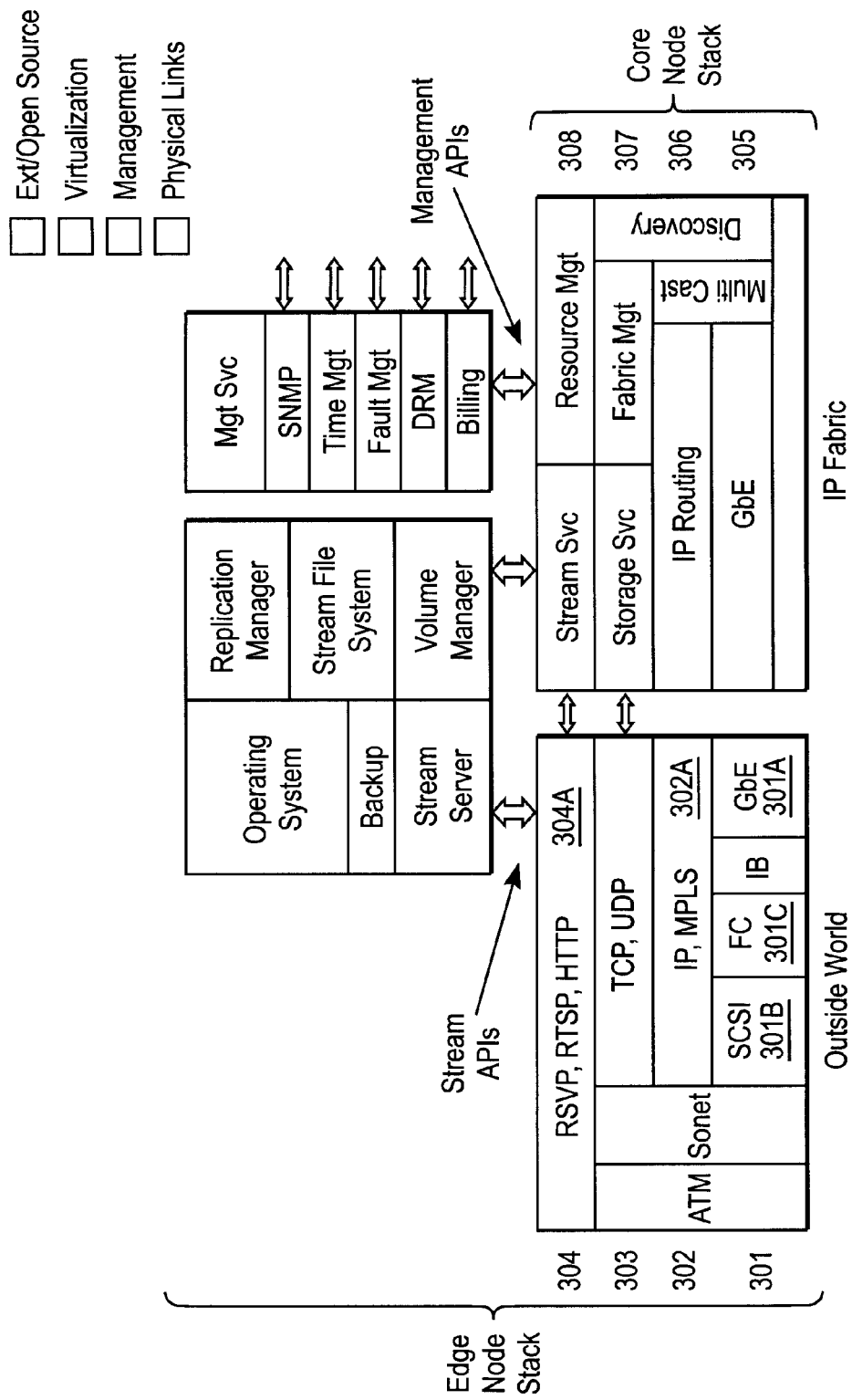
FIG. 3 shows the protocol stacks used in the present invention.

FIG. 3 shows the protocol stacks used in one embodiment of the present invention. The system employs a protocol such as MPLS 302A that is spliced into layer 302, and RSVP in application layer 304 to assure that a QoS constraint can-be met, and such protocols as Gigabit Ethernet (GbE) 301A, SCSI (Small Computer System Interface) 301B or Fibre Channel (FC) 301C for links between switches 202 and routers 201 and the stream engine node 204 and stream director nodes 205.

MPLS (Multiprotocol Label Switching) 302A is a protocol that relies on a modified set of routing tables in the routers making up a network. The routing tables are modified to route based on a specific label rather than source and destination addresses in packet headers. This permits faster service through the routers 201 and guarantees a fixed transmission path throughout the network, which provides a mechanism by which a QoS constraint can be enforced.

In the protocol, routing occurs based on label-switched paths (LSP), which are a sequence of labels at every node along the path from the source to the destination of a connection. An LSP is established prior to the data transmission by means of a label distribution protocol (LDP) or other similar protocol. Labels are spliced into a Layer 2 header. A router that receives such a packet examines the label to determine the next hop in the pre-established route. Information called a forward equivalence class (FEC) is bound to a label in each router that participates in the LSP. The FEC determines the service requirements that a packet or set of packets receive when traversing the LSP.

Devices that participate in the LSP are Label Edge Routers (LERs) and Label Switching Routers (LSRs). Label Edge Routers operate at the edge of the LSP and LSRs operate in the core of the network to support the LSP.

In order for a data packet to travel through a network according to an LSP several steps occur prior to the data actually traversing the LSP. First, labels are created and distributed to the various routers in the network from source to destination of the connection. In this step, the routers bind labels to FECs. Second, tables in the routers are constructed. These tables contain the mappings between a label and a FEC. Third, an LSP is created starting from the destination and working towards the source from which label distribution started.

RSVP (Resource Reservation Protocol) 304A is an application level protocol that uses IP datagrams as the signaling mechanism for LSP setup communications. These communications include peer discovery, label requests and mapping and management. The protocol supports a RESV message to reserve resources with traffic and QoS Parameters (such as guaranteed bandwidth) in the LSR upstream direction (towards the ingress). In one embodiment, the upstream direction for RSVP 304A is away from the client/user system and the downstream direction is towards the client/user system. This means that, in this embodiment, the user/client system obtains information from the streaming server system in order to send the RESV message to reserve resources along an LSP. In an alternative embodiment, the upstream direction is towards the client/user system. A RESVConf message to confirm the LSP setup is sent in the downstream direction (towards the client/user system). Once the reservations have been setup in the LSP, refresh messages are required to maintain the path and the reservations.

Figure 4A:
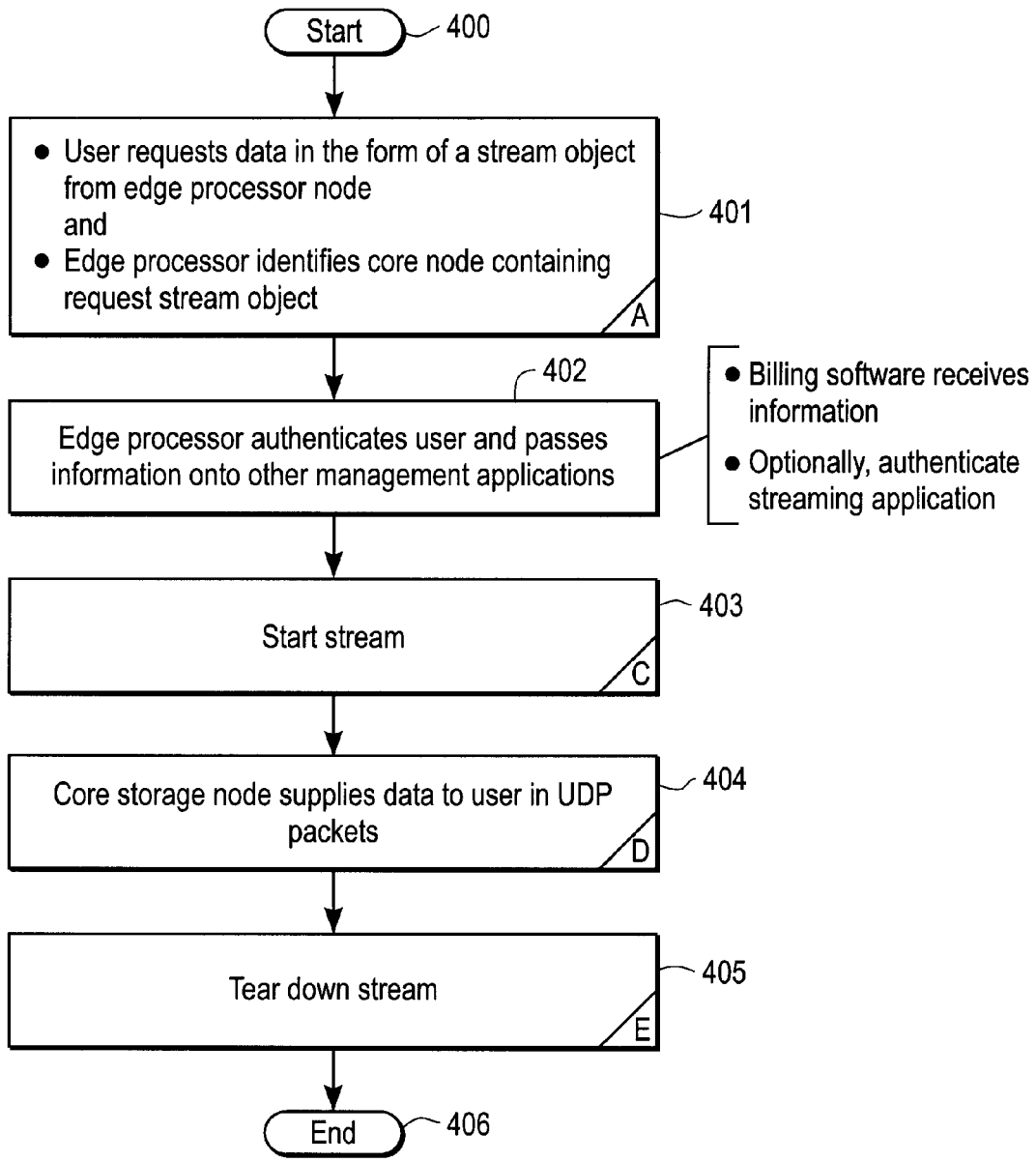
FIGS. 4A-4F show flow charts for processing a request for content in the form of a stream.

FIGS. 4A-4F show flow charts for processing a request 107 for content in the form of a stream. FIG. 4A is the top level flow chart and steps in that flow chart that have designators are described in more detail in a separate flow chart, corresponding to that designator. A non-primed designator signifies entry into the flow and a primed designator signifies return to the flow that invoked the step with a designator.

In FIG. 4A, the user first requests 401 content in the form of a stream object from a stream director node 205 and the stream director node 205 identifies the stream engine node 204 that contains the requested stream object. This step is shown in detail A, FIG. 4B. The stream director node 205 then authenticates and authorizes 402 the user and passes information, such as billing information onto other management applications. Optionally, in this step, the low level drivers can be authenticated and configured for streaming. Next, the stream is started 403, in detail C. The stream engine node then supplies 404 the data to the user in UDP packets in detail D, after which the stream is torn down 405 and the resources that were used are freed, in detail E.

Figure 4B:
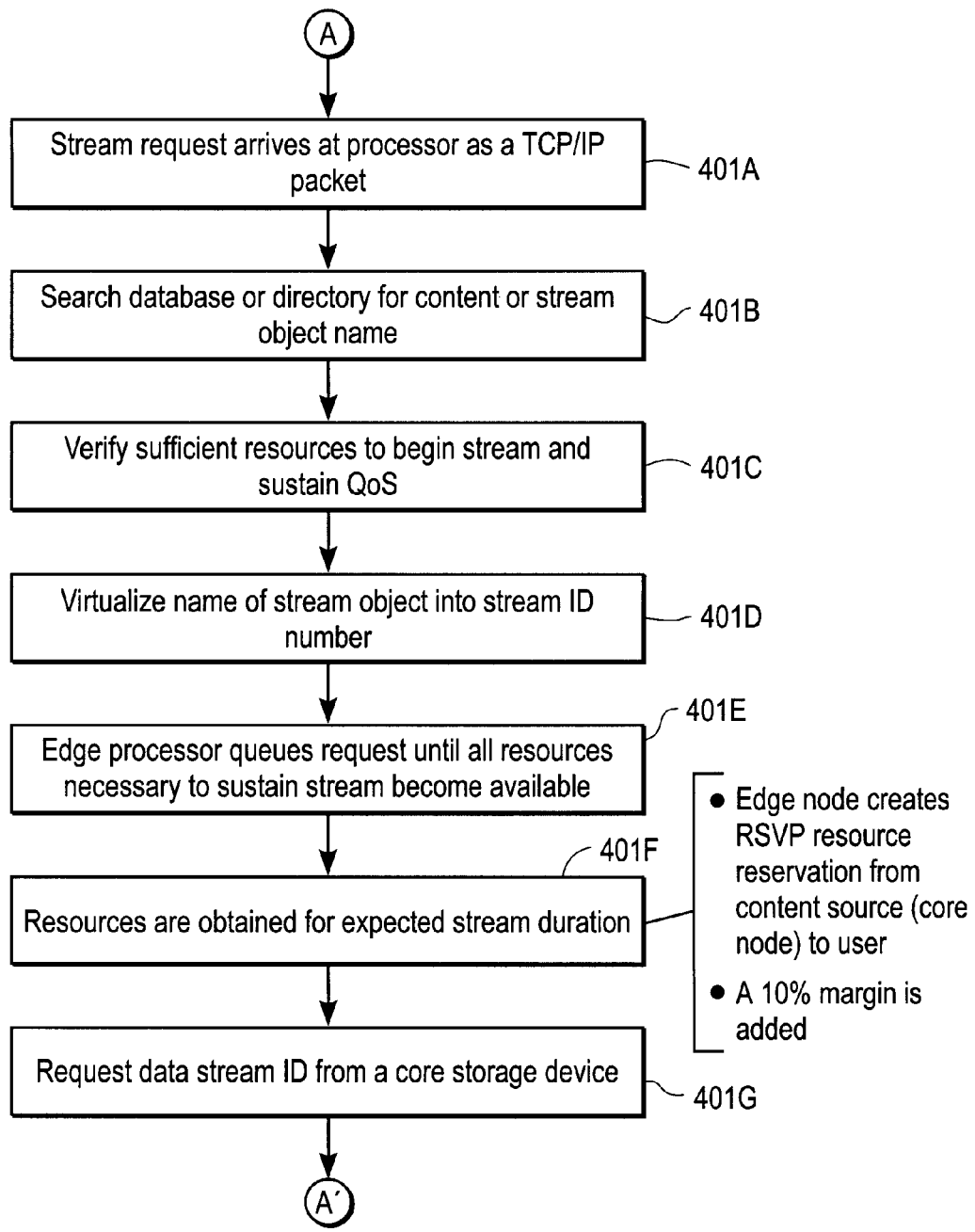

FIG. 4B, detail A shows that a stream request arrives 401A at the stream director node 205 as a TCP/IP packet. A database or directory is searched 401B, next, to find the content requested or the stream object name, following which verification occurs 401C to determine whether there are sufficient resources to begin the stream and sustain certain QoS constraints. Next, the name of the stream object is virtualized 401D into a stream ID number, and the stream director node queues 401E the request.

Figure 4C:
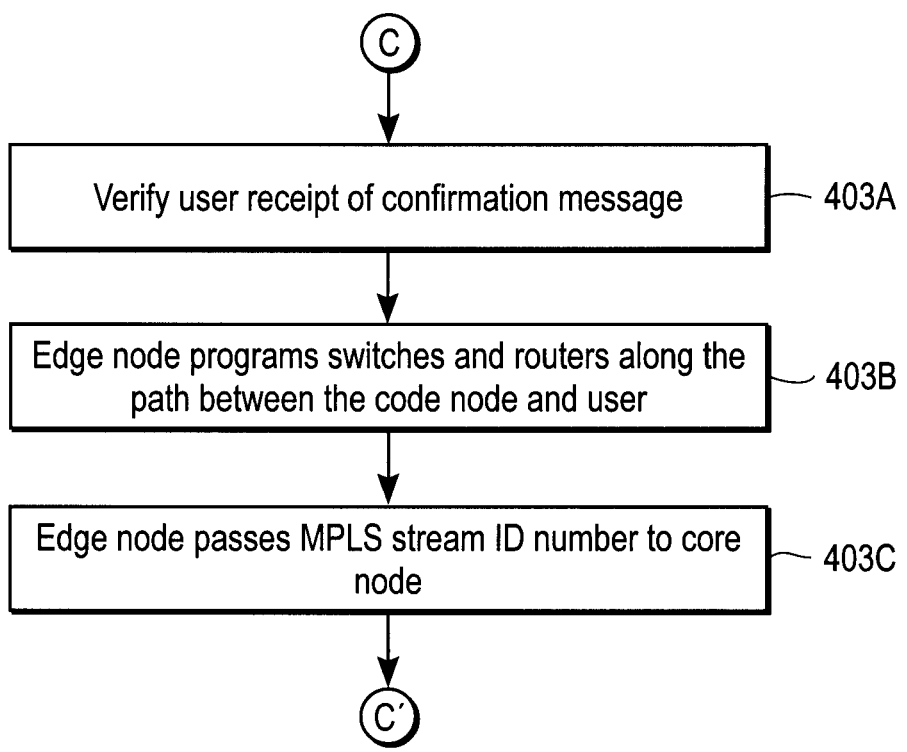

In FIG. 4C, detail B, the steps of authenticating the user and passing information to other management applications are set forth as well as enabling the user to issue a reservation request for resources. First, the user/client is authenticated, its authorization to use the streaming server is checked, and information is sent to billing software to charge the client for the use of the streaming server or a downloaded streaming media object. Next, the location of the streaming media object and reservation parameters are passed back to the user. The user/client then issues a reservation request for resources along the path from the user to the stream director node. When resources necessary to provide and maintain the stream actually become available for the expected stream duration (plus about a 10% margin), the request is de-queued. Finally, the data stream ID is assigned for use by the stream engine node.

In FIG. 4C, detail C, the steps to start a stream 403 are set forth. The stream director node 205 verifies 403A user receipt of a confirmation message that resources are reserved. Then the stream engine node 204 verifies 403B that switches and the routers along the path between the stream engine node 204 and the user are properly programmed. The stream director node 205 then passes 403C the stream ID number to the stream engine node 204.

Figure 4D:
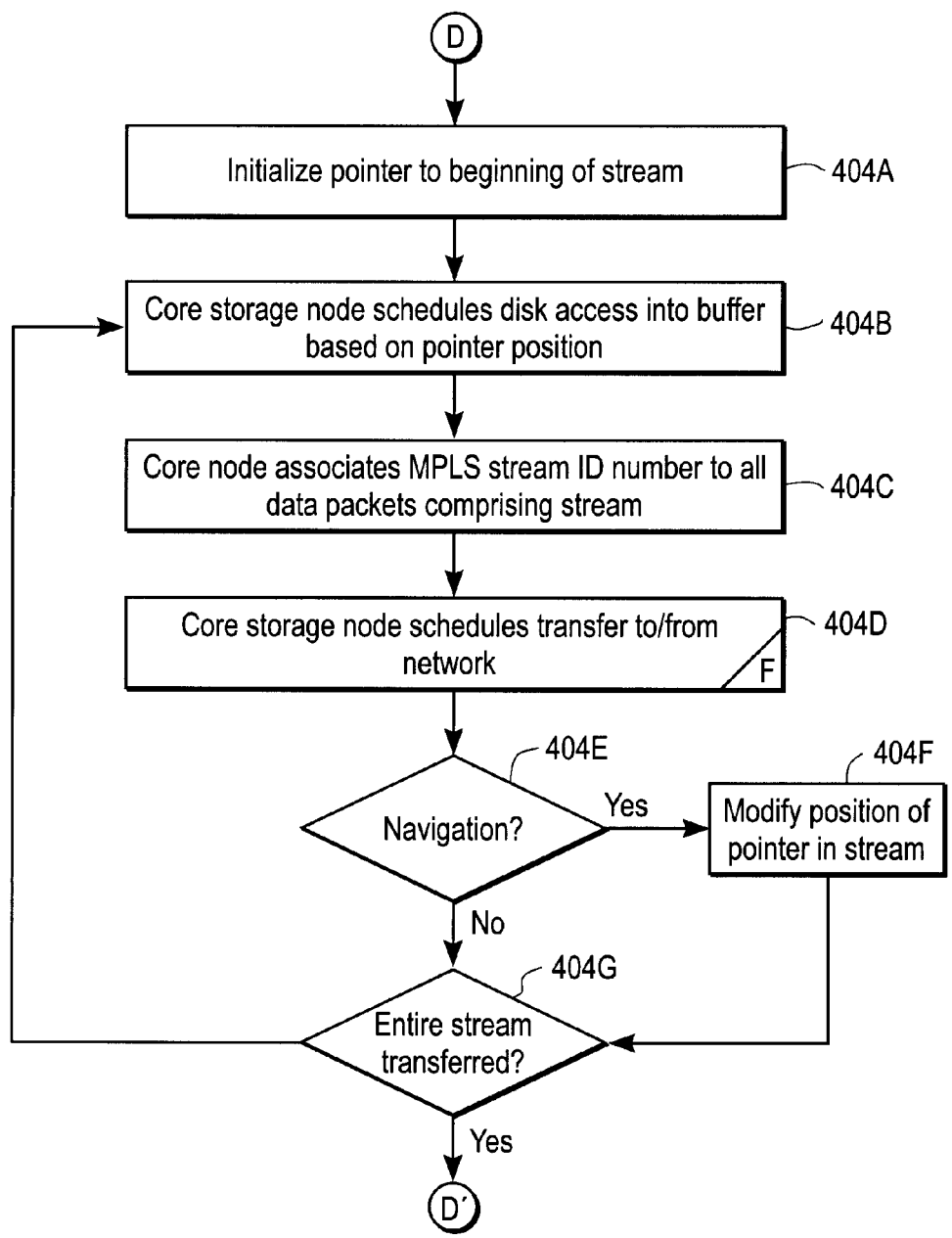

In FIG. 4D, detail D, the steps of the stream engine node 204 supplying the data to the user in UDP packets are set forth. First, a pointer is initialized 404A to point to the beginning of the stream. The stream engine node 204 then schedules 404B a transfer from the disk to a buffer based on the pointer position and associates 404C the MPLS stream ID number to all data packets comprising the stream. The stream engine node 204 next schedules 404D transfer to the network as described below in connection with FIG. 4F. If during the transfer a navigation request 404E is received, the pointer to the stream is modified 404F, and if the navigation has not caused a move to the end of the stream 404G, the loop 404B-404G repeats with the stream engine node 204 scheduling a disk access at the new pointer location into the buffer. Transfers from the network to a stream engine node 204 are also contemplated. To transfer a streaming object from the network to a stream engine node 204, the stream engine node 204 first schedules a transfer into a buffer from the network. A disk access is then scheduled to write the buffer onto the disk included in the stream engine node 204.

Figure 4E:
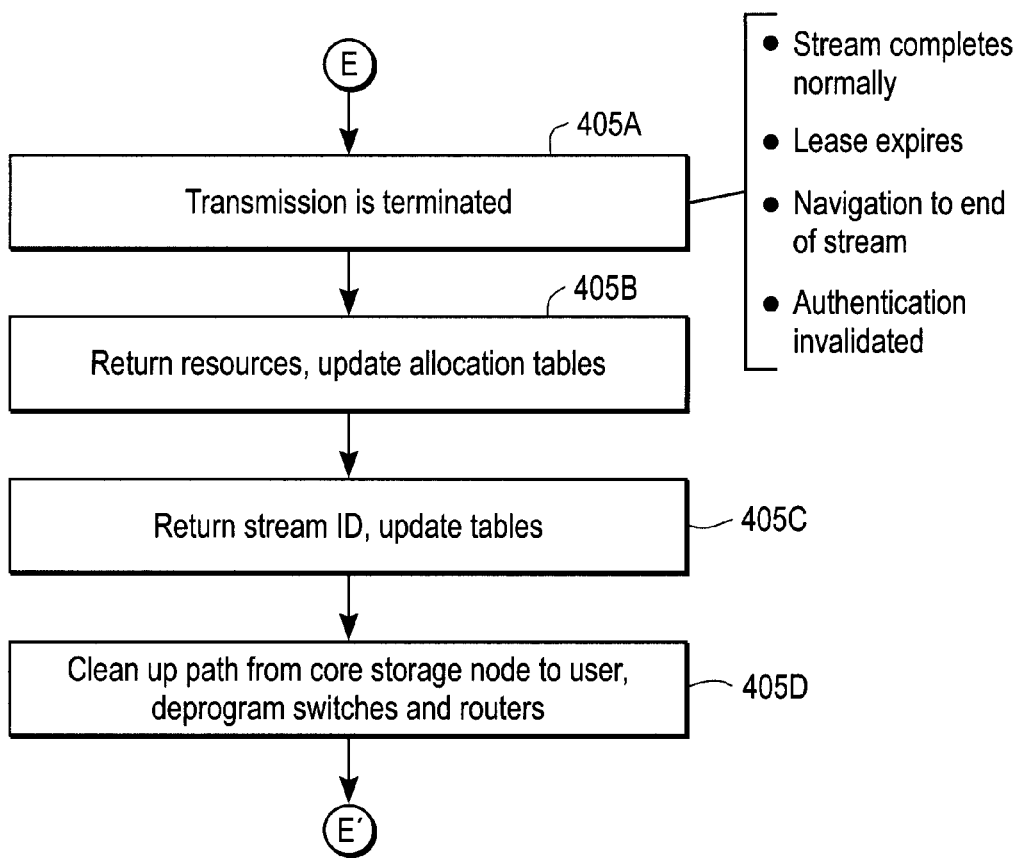
Figure 4F:
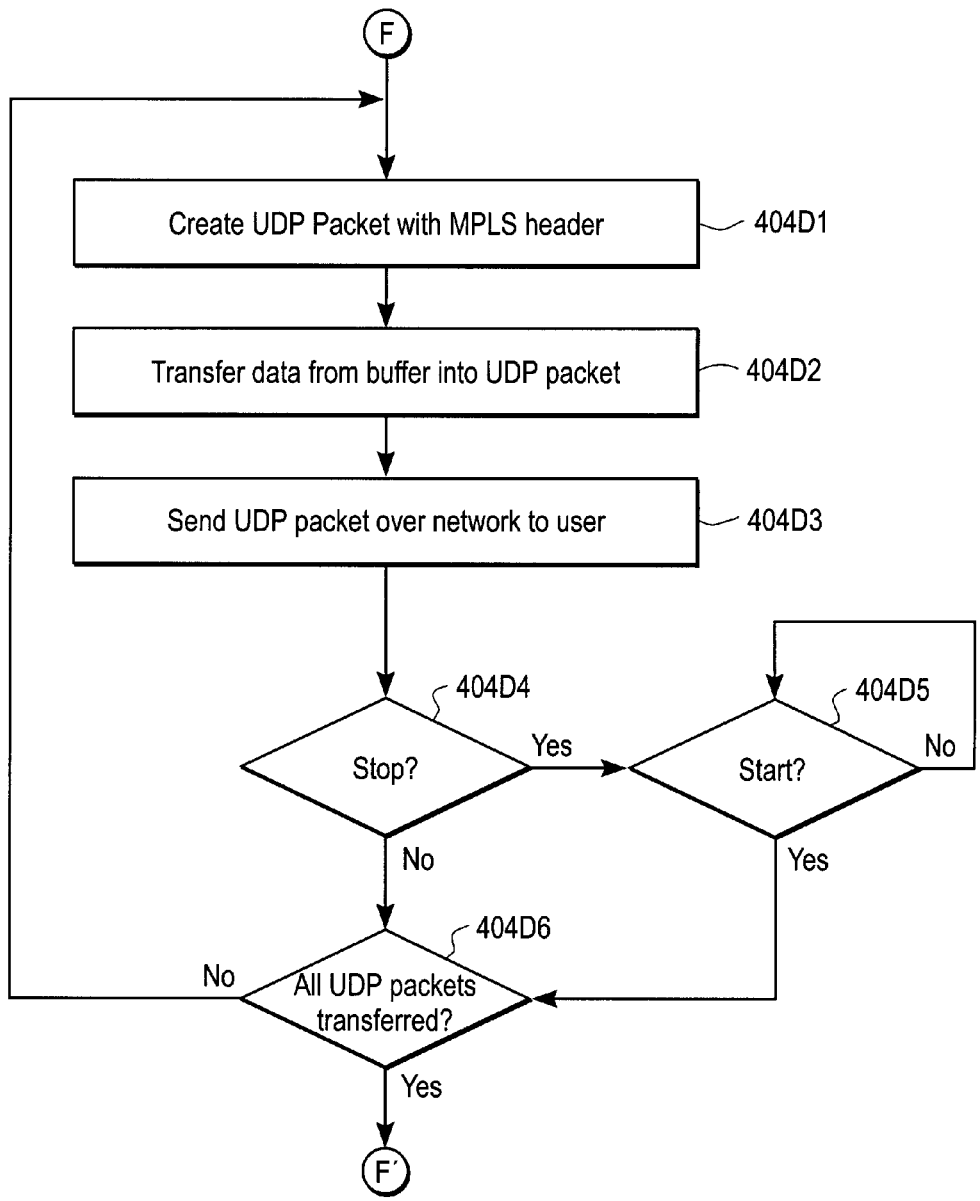

FIG. 4F, detail F sets forth the steps by which the stream engine node 204 schedules the transfer of the buffer to the network. First, a UDP packet is created 404D1 with a MPLS header. Next data is transferred from the buffer 404D2 into the UDP packet. The UDP packet is then sent 404D3 over the established LSP in the network. If the user has requested that the stream stop 404D4 possibly as a result of flow control or buffering limitations, then a wait loop 404D5 is entered until the stream is started again. This continues until all of the UDP packets making up the stream have been transferred 404D6 to the user. To transfer data from the network to the stream engine node 204, first the UDP packet is received and then transferred to a buffer, which is written to the disk included in the stream engine node 204.

FIG. 4E, detail E, sets forth the steps for tearing down the stream. The stream transmission is terminated 405A either because the stream completed normally, the reservation of resources expired, the user navigated to the end of the stream or the user's authentication is invalidated. Next, the resources reserved for the stream are released 405B and allocation tables are updated. The stream ID is then returned 405C and tables associated with the stream ID are updated. Finally, the LSP from the stream engine node 204 to the user is cleaned up 405D by deprogramming the switches 202 and routers 201 involved in the LSP.

Directory Enabled Network Services

Figure 7:
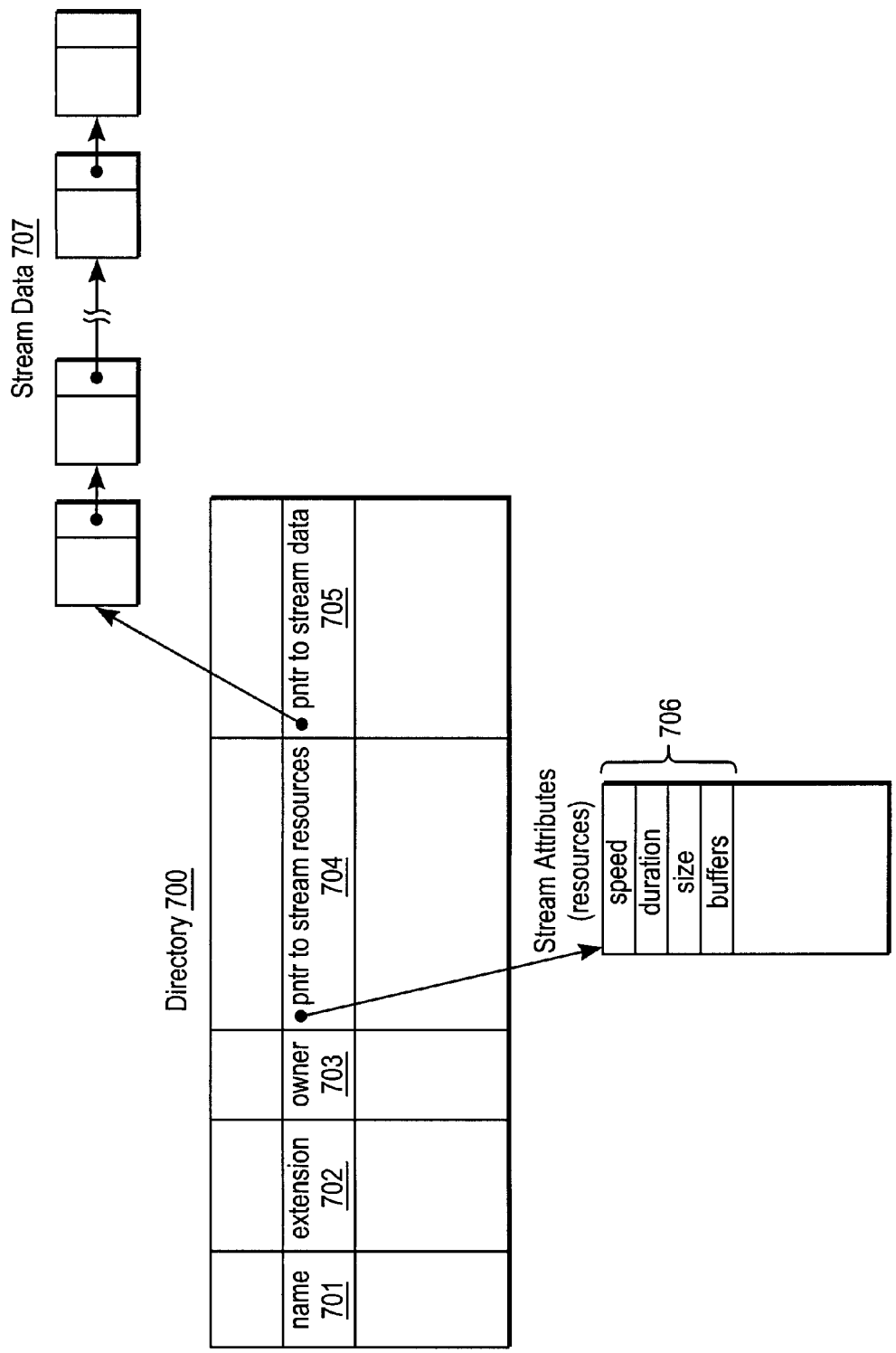
FIG. 7 shows a representative directory in accordance with the present invention.

Because stream objects have a relatively long lifetime ranging from seconds to hours, there is no need for complex databases to keep track of the streams. A directory 700 as shown in FIG. 7, located in the stream director node 205, is sufficient. This directory 700 contains the common file or external object name 701 of each stream. The stream director node 205 virtualizes the streams by presenting each stream as an object or file to the outside world. A typical directory 700 lists the stream objects by name or number, along with the resources 706 or attributes 702, 703 associated with the stream. The directory 700 thus provides a simple means for managing stream objects distributed across stream engine nodes 204.

In the present invention, a directory 700 contains the paths or routes 705, 704 (the Border Gateway Protocol (BGP) may be used to share route information) to each stream object 707 and the resources 706 required along the path to sustain the stream. When a request arrives at the stream director node 205 containing the directory 700, the stream director node 205 determines the location of the desired object and possible routes the stream data may traverse.

In addition to the directory 700, the stream director node also contains a list of resources 706, such as available bandwidth and buffers. Leases associate an object with a resource for a specified amount of time. When a lease expires, the object no longer moves through the network and the associated resources are returned. The stream director nodes 205 track available resources, and inform each other whenever a lease is granted for a resource.

Load Balancing

Because storage capacity is increasing faster than the speed of an individual stream engine node 204, load balancing is preferably accomplished by replicating the stream object on multiple stream engine nodes. Replication, i.e., the complete copy of a stream object on another device, doubles or further multiplies the number of streams that may be served.

Within a directory 700, replicated stream objects are adjacent. A stream director node 205 can easily determine the load associated with access to and from a particular stream object by examining the lease reservations in the corresponding directory 700 entry. The stream director node 205 balances the load by choosing the stream engine nodes 204 with the lowest load (fewest or shortest lease reservations). If no replicated stream objects have sufficient resources, then the user's request is held until such time as enough lease reservations expire to support the request.

In an alternative embodiment, a small amount of resources are allocated to a background task that creates another stream object copy dynamically, as needed. Once the replicated storage object is available on another stream engine node 204, the load on the overburdened node 204 is mitigated. After the demand for the storage object subsides, the replicated storage object is abandoned.

Figure 5:
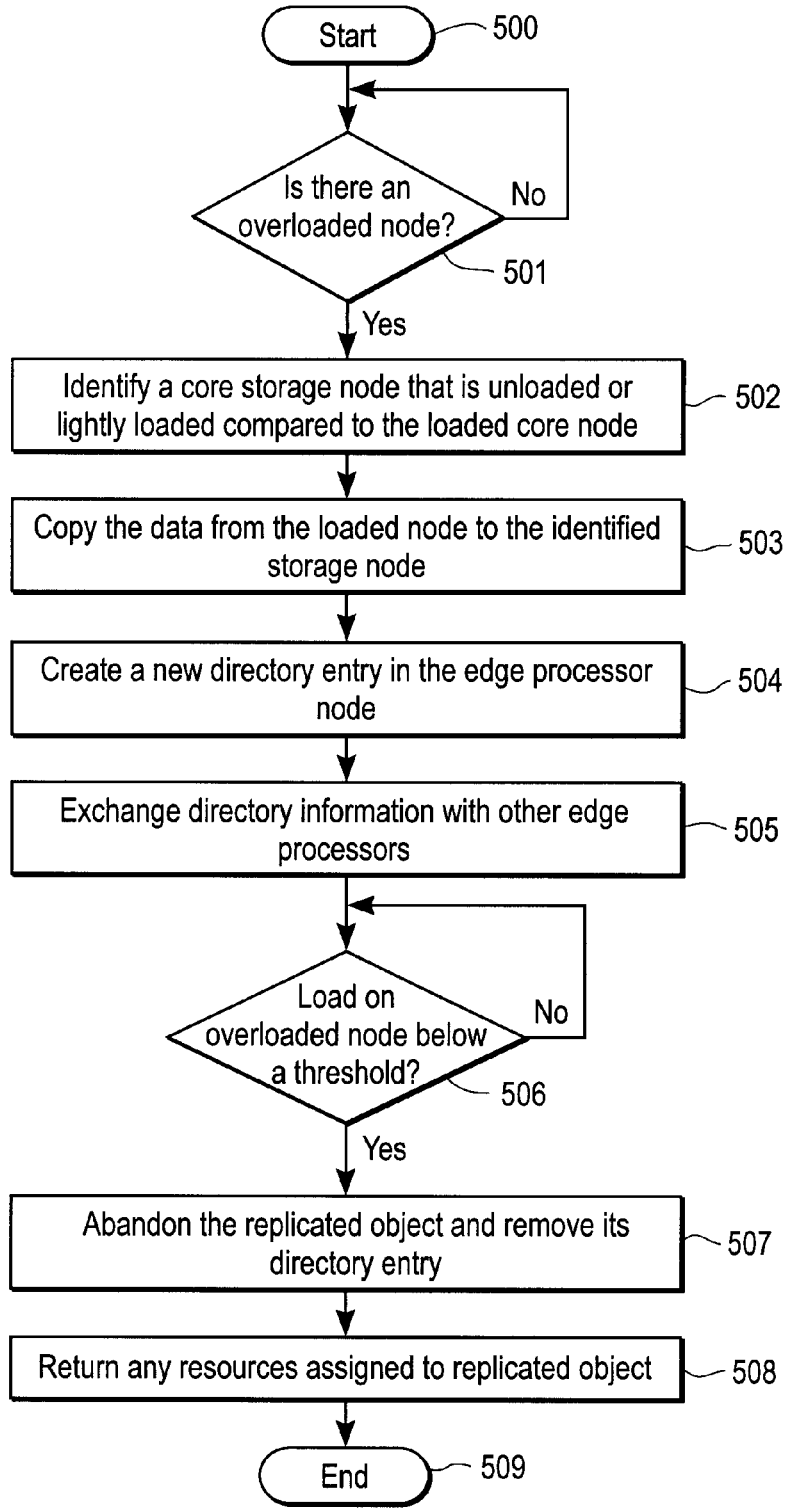
FIG. 5 shows a flow chart for load balancing in the present invention.

FIG. 5 sets forth the steps for load balancing the stream engine nodes. First a test 501 is made to determine whether a stream engine node 204 is overloaded. If so, a stream engine node 204 that is unloaded or lightly loaded compared to the overloaded node 204, is identified 502, and the object data causing the overloaded condition is copied 503 from the overloaded node 204 to the identified node 204. Next, a new directory entry is created 504 in the stream director node's 205 directory 700 and that information is shared 505 among all of the other stream director nodes 205. If the load on the overloaded node 204 falls below a preset threshold 506, then the replicated object on the identified node 204 is abandoned 507 by removing its entry from the directories 700, and any resources assigned to the replicated object are returned 508.

Authenticating and Configuring Low Level Device Drivers for Streaming Data Operation Device drivers operate to abstract the underlying hardware apparatus, such as a hard disk drive (HDD), for file systems and operating systems. In particular, the device driver abstracts the attributes of a variety of types of HDDs into a consistent interface, called an Application Programming Interface (API) or I/O Control Interface (IOCTL).

As part of this abstraction, present device drivers translate the logical block addressing (LBA) of the HDD into the cluster or block addressing of the file system. For example, HDD blocks are small, on the order of 512 bytes, while file system blocks are 2 KB to 8 KB. The file system block sizes align well with the paging memory subsystems that are used in virtual memory operating systems such as Unix, Linux, Windows NT, Solaris and VMS.

A well-designed device driver attempts to minimize the movement of the HDD positioning arm and rotational delays associated with the HDD access. The device driver accomplishes this by accessing larger amounts of data than requested of the device. These larger accesses effectively pre-fetch data into memory in anticipation of a future request. For example, the Linux Operating System may obtain up to 64K bytes from the HDD when a request is made of an HDD.

However, as large as these requests are, streaming requests are even larger. In the case of a video stream a request of 1 Megabyte is not uncommon. These large requests tend to flush other useful data out of the pre-fetch memory and degrade the performance of traditional applications. Furthermore, these large requests may cause positioning arm movements due to crossing cylinder boundaries and may require several rotations of the HDD to obtain. It is desired that these transfers avoid the positioning arm and rotational delays as much as possible in order to facilitate the meeting of QoS constraints.

Therefore, the invention dynamically configures device drivers for either traditional operation or streaming operation. Because device drivers are aware of the application or process requesting service, this becomes a matter of identifying or authenticating the process as a streaming process. Default device driver requests are sized according to the particular operating system. Streaming applications cause the device driver to reconfigure itself for the specific request size required to sustain the stream. For example, audio streams are expected to have smaller request sizes than video streams.

The streaming application authenticates by sending an authentication request to an authentication server located on the World Wide Web. The authentication server verifies that a valid license has been issued to the client/user of the streaming application.

Figure 6A:
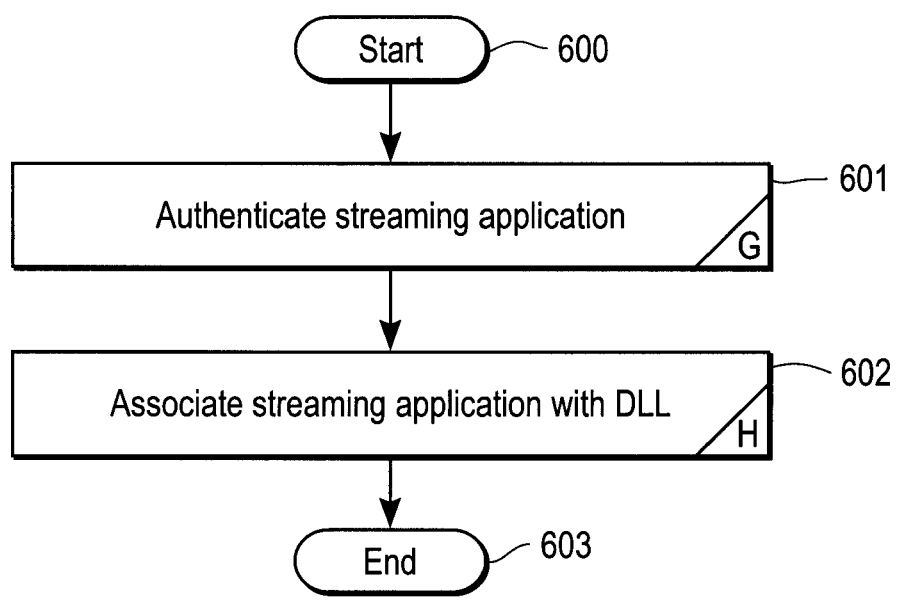
FIG. 6A-6E show flow charts for authenticating and configuring low level device drivers for streaming data operation.
Figure 6B:
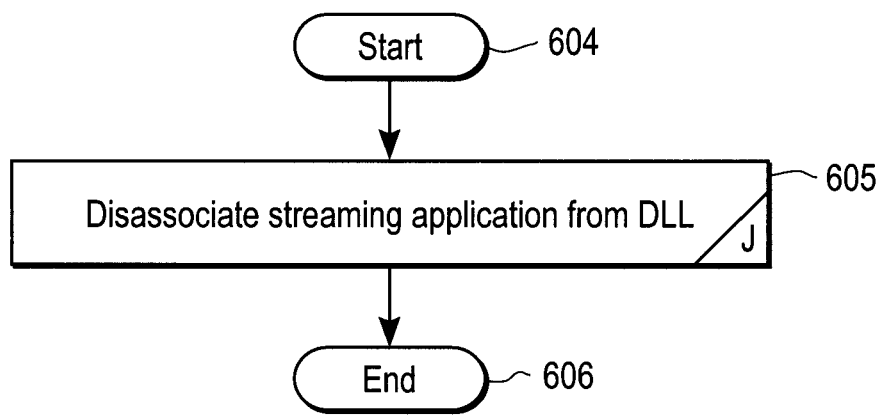

FIGS. 6A-6E set forth the steps for authenticating and configuring low-level device drivers for streaming data operation. The authentication process, preferably occurs at the time that a streaming request is received at the stream director node 205. The streaming application is authenticated 601 and is associated 602 with a Dynamic Link Library (DLL). In FIG. 6B, the streaming application is disassociated 605 with the DLL (see detail J).

Figure 6C:
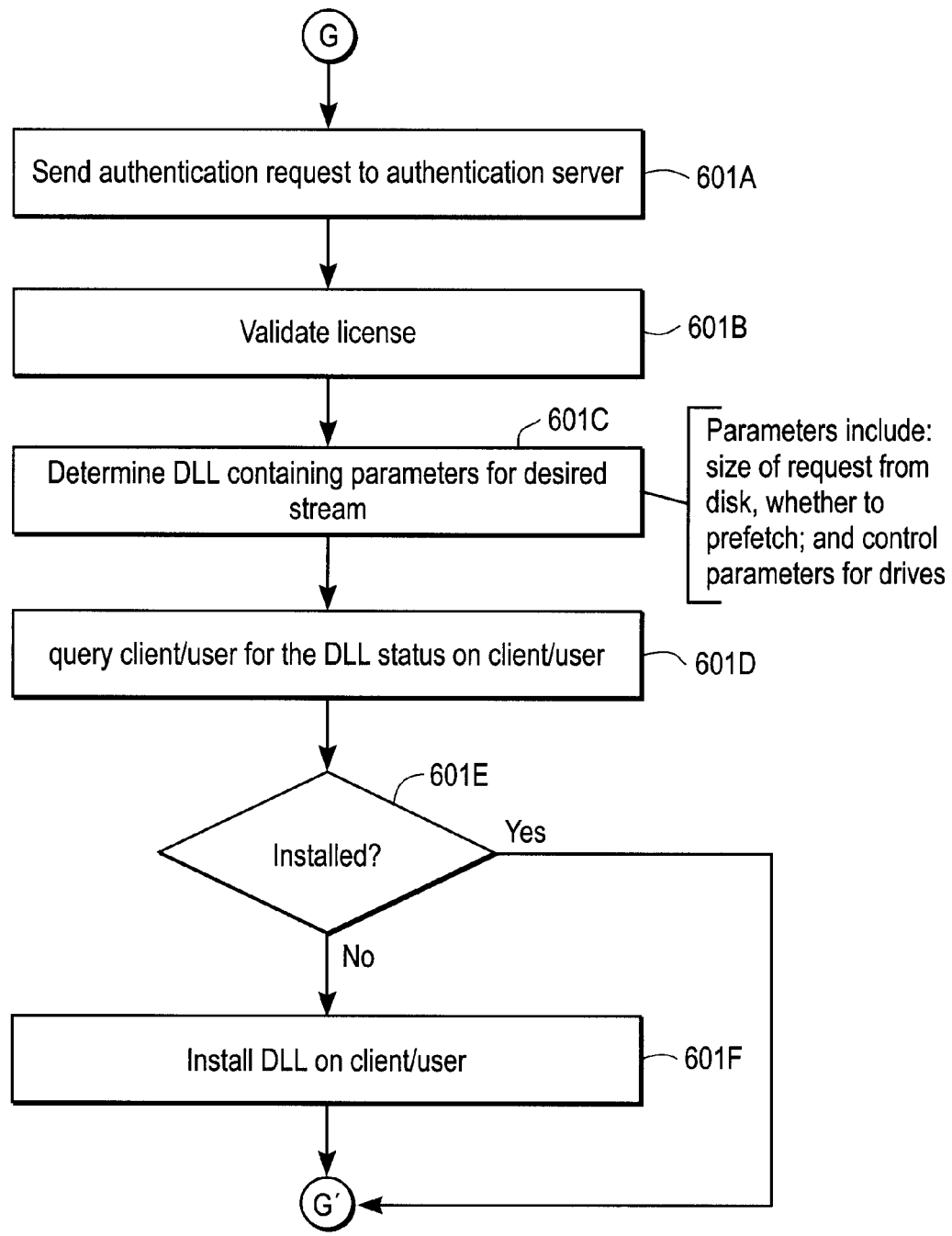

FIG. 6C sets forth the steps of detail G. First an authentication request is sent 601A to the authentication server, which then validates 601B the license of the requester. Next, the authentication server determines 601C the DLL containing the parameters for the desired stream and then queries 601D the client/user for the status of the DLL (installed or not) 601E on the client/user system. If the DLL is not installed, the DLL is sent and installed 601F on the client/user system (because that system is part of the connection that is involved in the streaming data transfer).

Figure 6D:
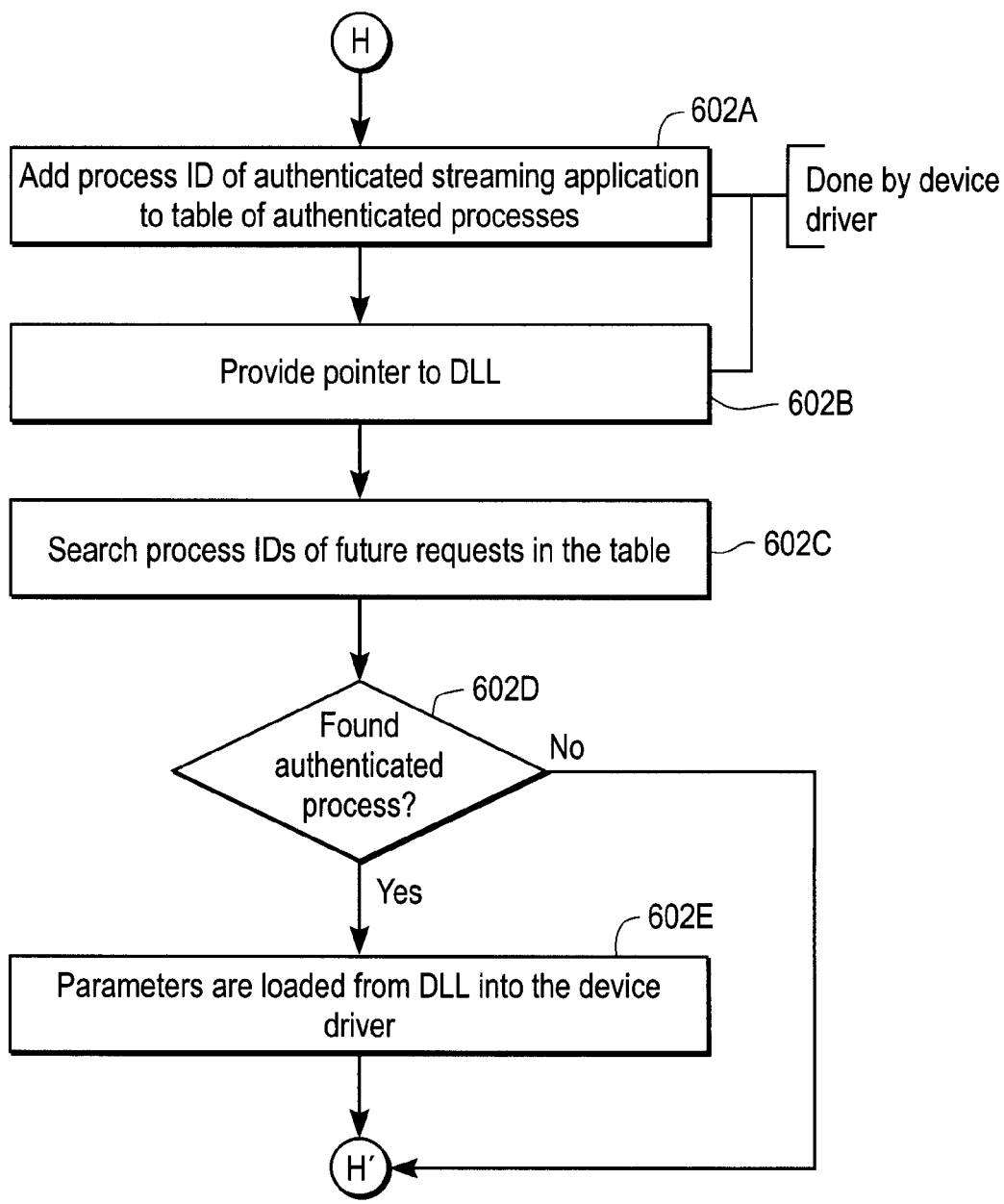

FIG. 6D sets forth the steps of detail H. In this flow, the process ID of the authenticated streaming application is added 602A by the device driver to a table of authenticated processes and a pointer to the DLL is provided 602B. Next, the process IDs of future requests are searched 602C for in the table. If an authenticated process is found 602D, the parameters in the DLL are loaded 602E into the device driver, thus configuring the device driver for streaming operation.

Figure 6E:
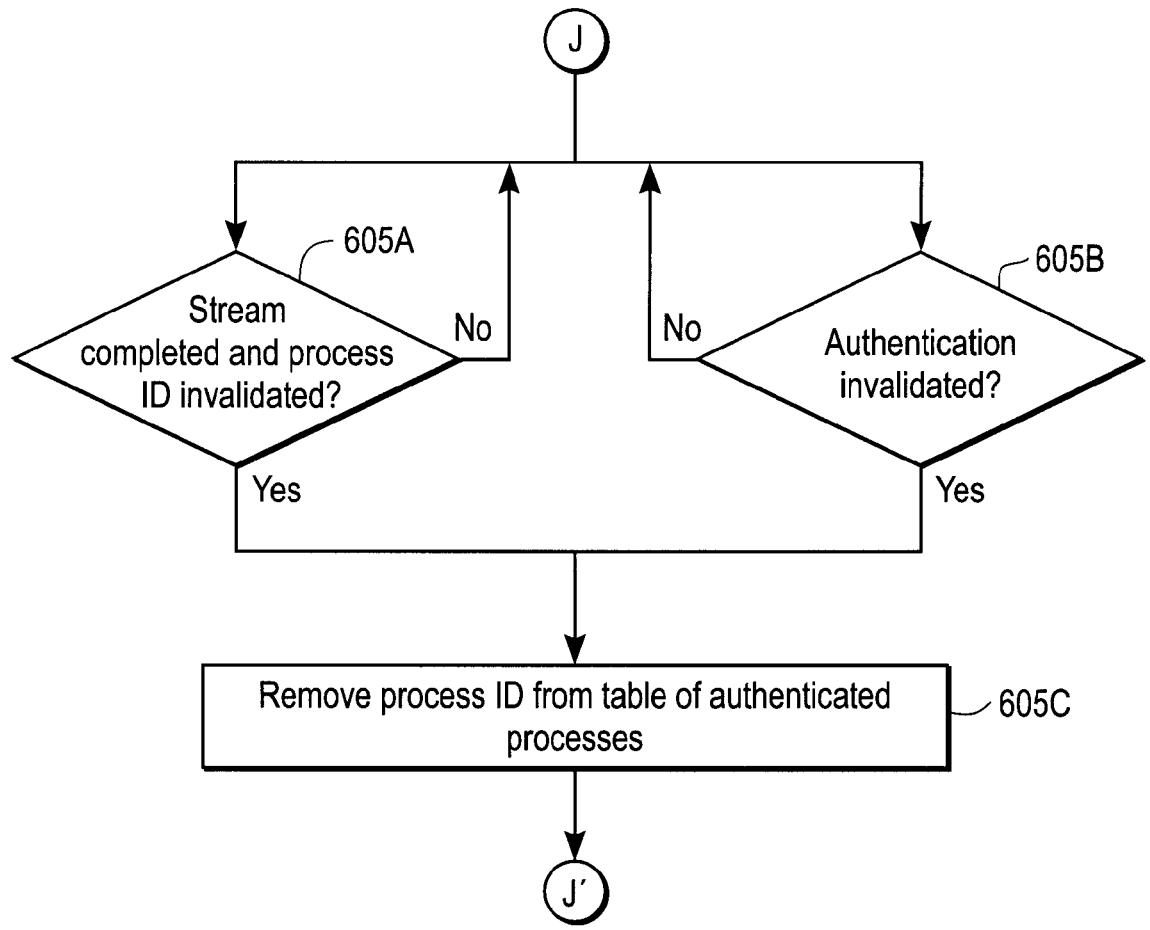

FIG. 6E sets forth the steps of detail J. Two cases are tested; either the stream has completed 605A or the authentication has been invalidated 605B. In either case, the device driver removes 605C the process ID from the table of authenticated processes, thus ending the association of DLL with the streaming application.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for servicing a request from a client system for transferring a streaming media object, the method comprising:
    receiving, at a stream director node comprising one or more hardware processors, a request from a client system for a streaming media object;
    by the stream director node, identifying a stream engine node that includes the streaming media object in a networked data storage from which the streaming media object is to be transferred;
    by the stream director node, authenticating and verifying that a user of the client system is able to reserve system resources; and
    responsive to successful authentication and verification that the user of the client system is able to reserve system resources:
        by the stream director node, passing back a location of the streaming media object to the client system;
        by the stream director node, verifying that sufficient system resources are available to service the request by testing a load of the networked data storage against a load threshold;
        responsive to failed verification that sufficient system resources are available to service the request, queuing, by the stream director node, the request until sufficient system resources become available; and
        responsive to successful verification that sufficient system resources are available to service the request:
            by the stream director node, dequeuing the request and preparing a data transfer path comprising one or more routers and one or more switches between the networked data storage and the client system that made the request, the stream director node not being included in the data transfer path;
            by the stream director node, programming the one or more routers and the one or more switches to cause the one or more routers and the one or more switches to be reserved for use in a data transfer of the streaming media object; and
            transferring by the stream engine node, over the data transfer path between the client system that made the request and the networked data storage, a stream of data in packets comprising the streaming media object.

2. The method of claim 1, further comprising, upon completion of the transfer, tearing down the data transfer path and de-allocating the one or more routers.

3. The method of claim 1, wherein a table is employed at the stream director node to keep track of a plurality of streaming data objects including the streaming media object that reside on the networked data storage.

4. The method of claim 1, wherein a table is employed at the stream director node to keep track of the system resources that are available for servicing a streaming media request.

5. The method of claim 1, wherein verifying that sufficient system resources are available to service the request further comprises:
    determining, based on testing the load of the networked data storage against the load threshold, that the networked data storage is overloaded by requests for the streaming media object; and
    copying the streaming media object to another networked data storage so that the another networked data storage is able to service the request for the streaming media object in place of the networked data storage.

6. The method of claim 1, further comprising:
    directing the networked data storage to transfer, over the data transfer path, the data to or from the client system that made the request; and
    performing the data transfer while meeting a Quality of Service constraint.

7. The method of claim 6, wherein the Quality of Service constraint includes an upper bound on a response time in servicing the request.

8. The method of claim 6, wherein the Quality of Service constraint includes a lower bound on a throughput in servicing the request.

9. The method of claim 1, wherein said verifying comprises verifying that sufficient system resources are available to provide and maintain a stream for the data transfer for an expected stream duration plus a margin.

10. The method of claim 9, wherein the margin comprises 10%.

11. A system for servicing a request from a client system for a streaming media object, the system comprising:
    at least one stream director node comprising a memory device and one or more hardware processors, the one or more hardware processors being configured to:
        receive a request from a client system for a streaming media object;
        identify a stream engine node that includes a streaming media object in a networked data storage from which the streaming media object is to be transferred;
        authenticate and verify that a user of the client system is able to reserve system resources; and
        in response to successful authentication and verification that the user of the client system is able to reserve system resources:
            pass back a location of the streaming media object to the client system;

verify that sufficient system resources are available to service the request by testing a load of the networked data storage against a load threshold;

in response to failed verification that sufficient system resources are available to service the request, queue the request until sufficient system resources become available; and in response to successful verification that sufficient system resources are available to service the request:

dequeue the request and prepare a data transfer path comprising one or more routers and one or more switches between the networked data storage and the client system that made the request, the at least one stream director node not being included in the data transfer path;

program the one or more routers and the one or more switches to cause the one or more routers and the one or more switches to be reserved for use in a data transfer of the streaming media object; and initiate a transfer, over the data transfer path between the client system that made the request and the networked data storage, a stream of data in packets comprising the streaming media object.

12. The system of claim 11, wherein the one or more hardware processors of the at least one stream director node is further configured to, upon completion of the transfer, tear down the data transfer path and de-allocate the one or more routers.

13. The system of claim 11, wherein the one or more hardware processors of the at least one stream director node is further configured to track a plurality of streaming data objects including the streaming media object that reside on the networked data storage.

14. The system of claim 11, wherein the one or more hardware processors of the at least one stream director node is further configured to keep track of the system resources that are available for servicing a streaming media request.

15. The system of claim 11, wherein the one or more hardware processors of the at least one stream director node is further configured to load balance requests between the networked data storage and another networked data storage.

16. The system of claim 11, wherein verification comprises the one or more hardware processors being further configured to:

determine, based on testing the load of the networked data storage against the load threshold, that the networked data storage is overloaded by requests for the streaming media object; and copy the streaming media object to another networked data storage so that the another networked data storage is able to service the request for the streaming media object in place of the networked data storage.

17. The system of claim 11, further comprising:

the networked data storage configured to:

store a plurality of streaming media objects including the streaming media object; and transfer, over the data transfer path, the data between the networked data storage and the client system that made the request.

18. The system of claim 17, wherein the networked data storage is further configured to transfer, over the data transfer path, the data between the networked data storage and the client system that made the request while meeting a Quality of Service constraint.

19. The system of claim 11, wherein the one or more hardware processors of the at least one stream director is further configured to verify that sufficient system resources are available to provide and maintain a stream for the data transfer for an expected stream duration plus a margin.

20. The system of claim 19, wherein the margin comprises 10%.

21. A system for servicing a request from a client system for transferring a streaming media object, the system comprising:

means for receiving a request from a client system for a streaming media object;

means for identifying a stream engine node that includes a streaming media object in a networked data storage from which the streaming media object is to be transferred;

means for authenticating and verifying that a user of the client system is able to reserve system resources;

means for passing back, responsive to successful authentication and verification that the user of the client system is able to reserve system resources, a location of the streaming media object to the client system;

means for verifying that sufficient system resources are available to service the request by testing a load of the networked data storage against a load threshold;

means for queuing, responsive to failed verification that sufficient system resources are available to service the request, the request until sufficient system resources become available;

means for dequeuing, responsive to successful verification that sufficient system resources are available to service the request, the request;

means for preparing a data transfer path comprising one or more routers and one or more switches between the networked data storage and the client system that made the request;

means for programing the one or more routers and the one or more switches to cause the one or more routers and the one or more switches to be reserved for use in a data transfer of the streaming media object; and means for initiating a transfer, over the data transfer path between the client system that made the request and the networked data storage, a stream of data in packets comprising the streaming media object.

* * * * *